H. C. SMITH.
Car Wheel.
No. 231,503. Patented Aug. 24, 1880.
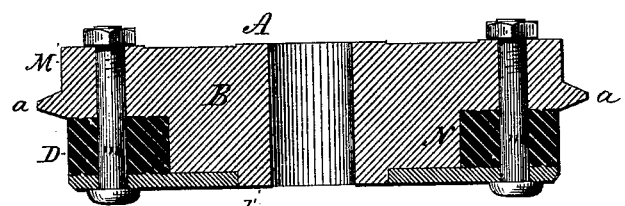
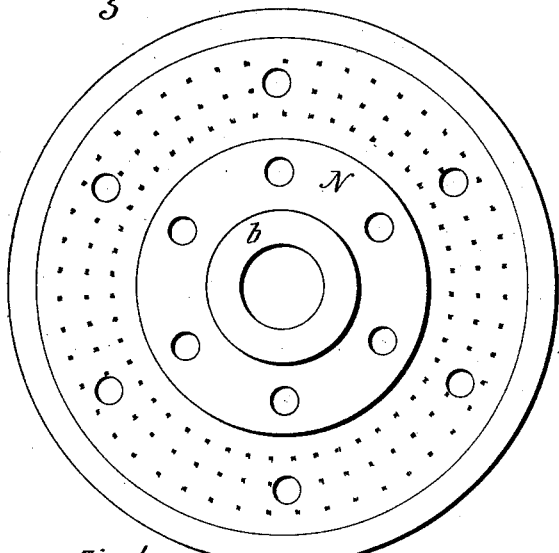
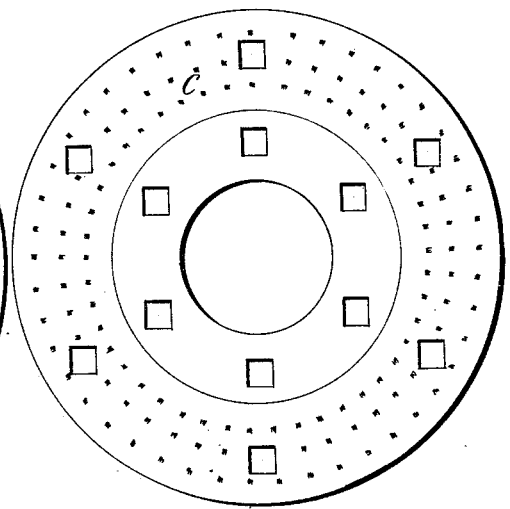
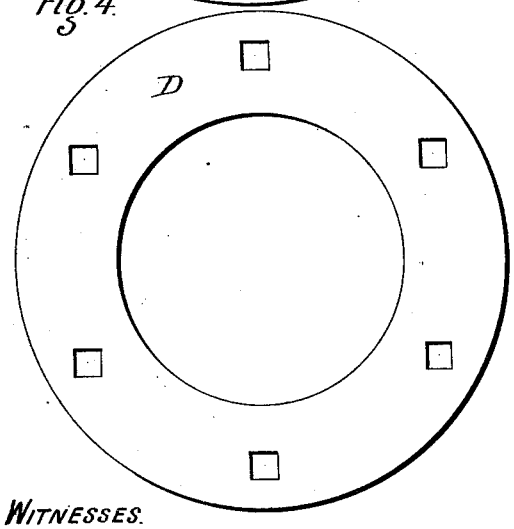
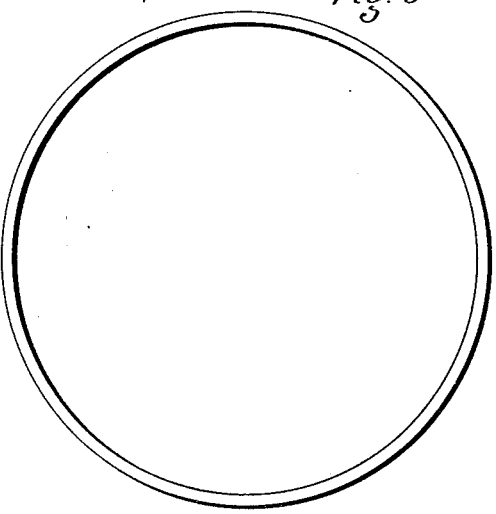

United States Patent Office.

HENRY C. SMITH, OF NEW YORK, N. Y.

CAR-WHEEL.

SPECIFICATION forming part of Letters Patent No. 231,503, dated August 24, 1880.

Application filed March 26, 1879.

*To all whom it may concern:*

Be it known that I, HENRY C. SMITH, of the city, county, and State of New York, have invented certain new and useful Improvements in Car-Wheels, of which the following is a specification.

My invention relates to that class of wheels the object of which is to deaden the sound made by the wheels on the track and to relieve by their elasticity the jolting of the cars.

The invention consists in making the wheel in parts, and of iron and other more elastic material, also in making the wheel of unusual width, with the flange in its center, for the purpose hereinafter more fully set forth.

In the drawings, which are hereby made a part of this specification, Figure 1 is a section through the center of the wheel, showing all its parts. Fig. 2 shows the inside of the flanged part. Fig. 3 shows a circular disk, a part of the wheel. Fig. 4 is a view of the elastic material, and Fig. 5 a view of the tire.

To enable others to make and use my improved wheel, I will describe it in detail.

The part B (shown in section in Fig. 1) is cast in one piece, forming the flange $a$, face M, hub N, on which the elastic part D is fitted, and shoulder $b$, onto which the circular disk C is fitted. The inside surface of the part B has projecting points to assist in holding the elastic material, as shown in Fig. 2.

The disk C, Fig. 3, is a circular plate having projecting points on its inside to assist in holding the elastic material, and fits on the shoulder $b$, as above stated.

The circular part D is made in the form shown in Figs. 1 and 4, fits onto the hub N, Fig. 1, and is made of any elastic substance, as hard rubber, wood, leather, or other suitable material. The parts B, C, and D have perforations, through which the bolts $m$ pass to hold the parts together. The part B, Fig. 1, has the metallic face M, on which the brake operates, to save the wearing of the face of the elastic part D.

Car-wheels constructed in parts in the manner shown have two faces, M and D, and with the elastic part D running on the rail, make little noise and jolt the cars very little. When desired, the central elastic parts may be made a little smaller, and an iron or steel tire (shown in Fig. 5) may be put on the same, the wheels giving nearly as good results.

Having described my invention, what I claim as new, and desire to secure by Letters Patent, is—

1. The car-wheel A, herein described, having two faces and consisting of the part B, provided with a flange and having the projecting points shown on its inside, of the circular disk or part C, also having projecting points on its inside, of the elastic part D, arranged and held between the before-mentioned parts, and of the bolts $m$, all the said parts constructed and combined as shown and set forth.

2. In a car-wheel, the combination, with the metal part B, having a brake-tread and a projecting guide-flange, of the non-resonant part D and an outer clamping-plate, substantially as described.

HENRY C. SMITH.

Witnesses:
GEORGE TERRY,
GEORGE P. SALISBURY.